United States Patent
Stiles, Jr. et al.

(10) Patent No.: US 8,200,373 B2
(45) Date of Patent: Jun. 12, 2012

(54) ENERGY PRODUCTION AND CONSUMPTION MATCHING SYSTEM

(75) Inventors: Robert W. Stiles, Jr., Cary, NC (US); Brian J. Boothe, Raleigh, NC (US)

(73) Assignee: Pentair Water Pool and Spa, Inc., Moorpark, CA (US)

( * ) Notice: Subject to any disclaimer, the term of this patent is extended or adjusted under 35 U.S.C. 154(b) by 281 days.

(21) Appl. No.: 12/799,375

(22) Filed: Apr. 23, 2010

(65) Prior Publication Data

US 2010/0274408 A1 Oct. 28, 2010

Related U.S. Application Data

(60) Provisional application No. 61/214,445, filed on Apr. 23, 2009.

(51) Int. Cl.
*G06F 19/00* (2011.01)
(52) U.S. Cl. .............. 700/295; 307/24; 307/31; 307/64
(58) Field of Classification Search .............. 700/295; 307/24, 29, 31, 32, 64
See application file for complete search history.

(56) References Cited

U.S. PATENT DOCUMENTS

| | | | | |
|---|---|---|---|---|
| 4,357,665 A | * | 11/1982 | Korff | 700/296 |
| 6,882,131 B1 | * | 4/2005 | Takada et al. | 323/282 |
| 6,889,122 B2 | * | 5/2005 | Perez | 700/295 |
| 7,171,374 B1 | * | 1/2007 | Sheehan et al. | 705/7.25 |
| 7,274,975 B2 | * | 9/2007 | Miller | 700/295 |
| 7,772,716 B2 | * | 8/2010 | Shaver et al. | 307/31 |
| 7,783,390 B2 | * | 8/2010 | Miller | 700/291 |
| 7,830,037 B2 | * | 11/2010 | Hirst | 307/39 |
| 7,962,249 B1 | * | 6/2011 | Zhang et al. | 700/295 |
| 2009/0012917 A1 | * | 1/2009 | Thompson et al. | 705/412 |
| 2009/0027932 A1 | * | 1/2009 | Haines et al. | 363/95 |
| 2009/0160187 A1 | * | 6/2009 | Scholte-Wassink | 290/44 |
| 2010/0019577 A1 | * | 1/2010 | Barlock et al. | 307/66 |
| 2010/0070100 A1 | * | 3/2010 | Finlinson et al. | 700/295 |
| 2010/0181780 A1 | * | 7/2010 | Gillett | 290/1 R |
| 2010/0207951 A1 | * | 8/2010 | Plaisted et al. | 345/473 |
| 2010/0274408 A1 | * | 10/2010 | Stiles et al. | 700/296 |

OTHER PUBLICATIONS

"Options for improving the load matching capability of distributed photovoltaics: Methodology and application to high-latitude data", Widen et al, Solar Energy 83, 2009.*
"Maximizing Efficiency of Solar-Powered Systems by Load Matching", Li et al, Univeristy of California Irvine, ISLPED 2004.*

* cited by examiner

*Primary Examiner* — Michael D Masinick
(74) *Attorney, Agent, or Firm* — J. Wiley Horton

(57) ABSTRACT

A system for balancing energy being consumed by a first device against the available energy being produced by a second separate device. One application for the invention is monitoring the amount of energy being produced by a photovoltaic array and using that information to control a load so that the load consumes substantially the same amount of energy as is then being produced by the array.

23 Claims, 9 Drawing Sheets

ENERGY PRODUCTION AND CONSUMPTION MATCHING SYSTEM

CROSS-REFERENCES TO RELATED APPLICATIONS

This non-provisional patent application claims the benefit, pursuant to 37 C.F.R. §1.53(c), of a previously filed provisional patent application. The prior application was assigned Ser. No. 61/214,445 filed on Apr. 23, 2009. It listed the same inventors.

STATEMENT REGARDING FEDERALLY SPONSORED RESEARCH OR DEVELOPMENT

Not Applicable.

MICROFICHE APPENDIX

Not Applicable.

BACKGROUND OF THE INVENTION

1. Field of the Invention

This invention relates to the field of energy management. More specifically, the invention comprises a system for matching the usage of energy by a first device to the production of energy being supplied by a second, separate device.

2. Description of the Related Art

The present invention is applicable to a diverse array of energy management applications. One particularly suitable application is the management of so-called "green" energy sources such as photovoltaic solar arrays. The invention is best understood by discussing specific applications, so a solar power example will be used throughout this disclosure. With that concept in mind, the reader may benefit from a brief discussion of existing solar collection technology.

Photovoltaic solar arrays convert sunlight into relatively low-voltage direct current. This electrical energy may be used directly, converted to another form (such as alternating current) or stored for future use. FIG. 1 shows an example of direct use. In this example, energy produced by a solar array is applied to a swimming pool circulation pump. A pool pump must be run during times when the sun is not shining. Thus, a conventional line powered pump 14 is retained in the system. Auxiliary pump 28 is added by plumbing it in parallel. Valves 32, 34, 36, and 38 are used to select between the two available pumps.

Auxiliary pump 28 is typically powered by a DC motor which is fed directly from solar array 24 by DC power line 30. When the sun is shining, the valves are positioned so that auxiliary pump 28 draws water in through pump inlet line 40 and discharges it through pump outlet line 42. When the sun in not shining, the valves are set to use pump 14.

Of course, a system such as depicted in FIG. 1 can never use solar power to run the auxiliary pump when the sun is not shining. In order to provide such a capacity, an energy storage means is needed.

Chemical batteries are typically used to store the energy. In this approach, the photovoltaic array is connected to a charge controller which regulates the flow of electricity into and out of the batteries. It is a simple matter for the charge controller to charge the batteries when the output of the photovoltaic array is greater than the battery voltage. However, some sophisticated charge controllers use pulse width modulation techniques to step up the available voltage from the solar array so that charging can continue even during the off-peak daylight hours—albeit at a lower current. These same controllers are able to provide a near-optimum charging voltage to extend the battery life. In this fashion, energy may be stored during peak sunlight hours and used to power loads when desired.

Many facilities using solar energy are tied to the conventional power grid. When the sun is shining, the available solar electricity is converted to alternating current in an inverter and used to power one or more selected AC circuits in the facility. At night, energy stored in chemical batteries can drive the inverter and this energy can also be used to power selected circuits. The circuits being powered by the solar energy must typically be isolated from the AC power in the rest of the facility so that amplitude and phase matching of the supplied solar energy is not required.

Unfortunately, the batteries in existing solar energy systems have proven to be the shortest-lived components. Photovoltaic arrays can have a useful life of twenty years or more. Being solid state devices, they require little maintenance. Chemical batteries—on the other hand—typically provide two to five years of service life. This may be greatly shortened if the batteries are drained too deeply. Some specialized battery designs offer longer life, but these tend to be very expensive. Thus, a solar energy system having no batteries would be a significant advantage. Such a system represents one application of the present invention.

BRIEF SUMMARY OF THE PRESENT INVENTION

The present invention comprises a system for balancing energy being consumed by a first device against the available energy being produced by a second separate device. One application for the invention is monitoring the amount of energy being produced by a photovoltaic array and using that information to control a load so that the load consumes substantially the same amount of energy as is produced by the array.

A communication link between the energy producing device and the energy consuming device is made using one of the available communication technologies. A ZIGBEE wireless communication protocol may be used. Alternatively, an Internet connection may be used. A control computer may be connected as well. In this embodiment, the load need not be matched to the energy producing device in real time, but may instead be matched using an "energy banking" algorithm. The use of a control computer also simplifies the control of embodiments including multiple power producers and multiple loads.

BRIEF DESCRIPTION OF THE DRAWING VIEW

REFERENCE NUMERALS IN THE DRAWINGS

| 10 | motor controller | 12 | motor |
|---|---|---|---|
| 14 | pump | 16 | load center |
| 18 | power meter | 20 | power grid |
| 22 | inverter | 24 | solar array |
| 26 | communication link | 28 | auxiliary pump |
| 30 | DC power line | 32 | valve |
| 34 | valve | 36 | valve |
| 38 | valve | 40 | pump inlet line |
| 42 | pump outlet line | 44 | power curve |
| 46 | input power lines | 48 | output power lines |
| 50 | R/F interface module | 52 | R/F interface module |
| 54 | Internet interface module | 56 | Internet interface module |
| 58 | Internet | 60 | control computer |
| 62 | HVAC unit | | |

DETAILED DESCRIPTION OF THE INVENTION

The present invention can be used to control a wide variety of energy producing and consuming devices. It encompasses everything from a simple system in which a single energy load is directly linked to a single energy harvesting device to a complex system in which multiple harvesting devices and multiple loads are linked across a widely distributed power grid. The reader may benefit, however, from beginning with a simple example.

Figure 1:
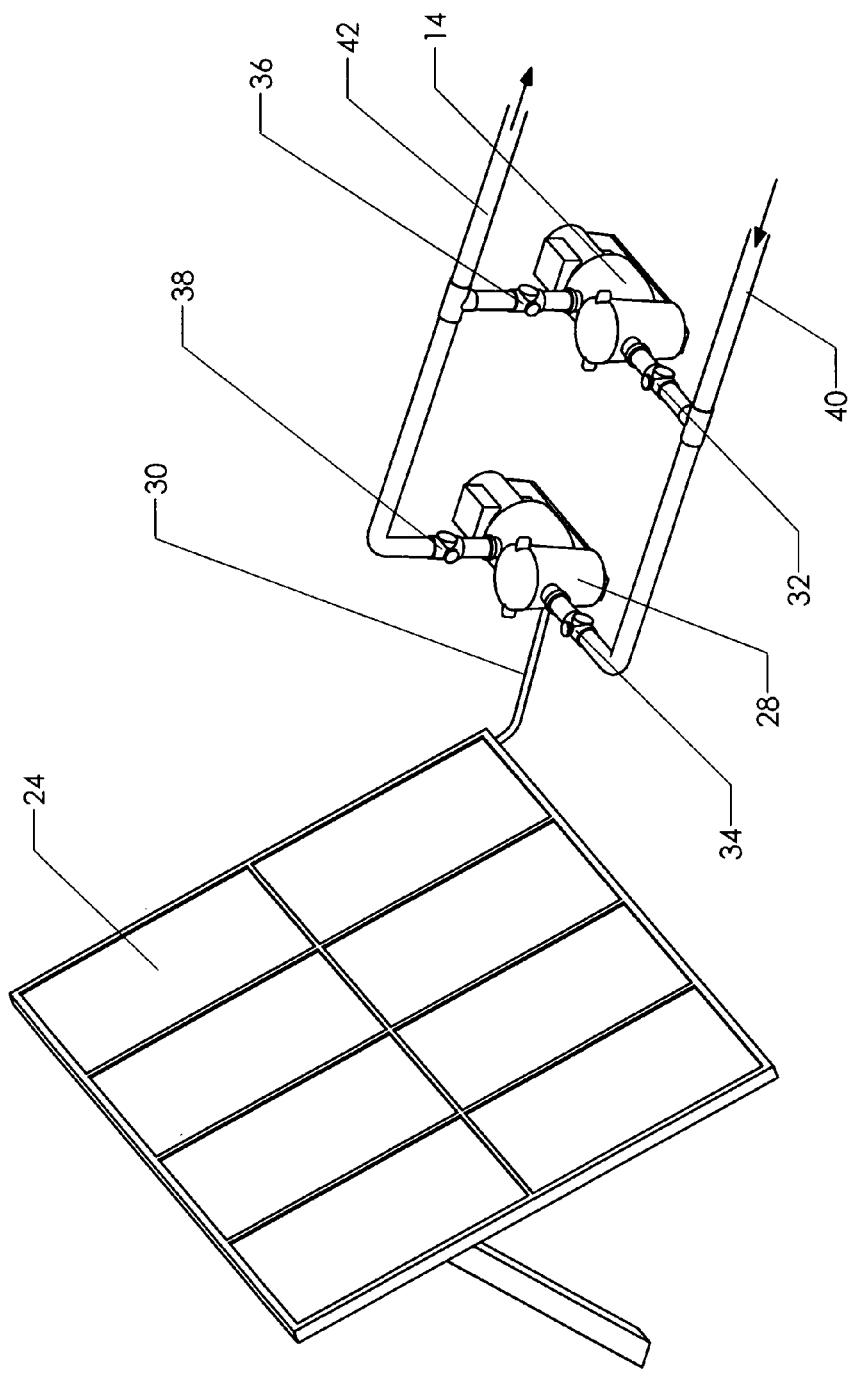
FIG. 1 is a schematic view, showing a prior art use of solar energy to provide power to an electrical load.
Figure 2:
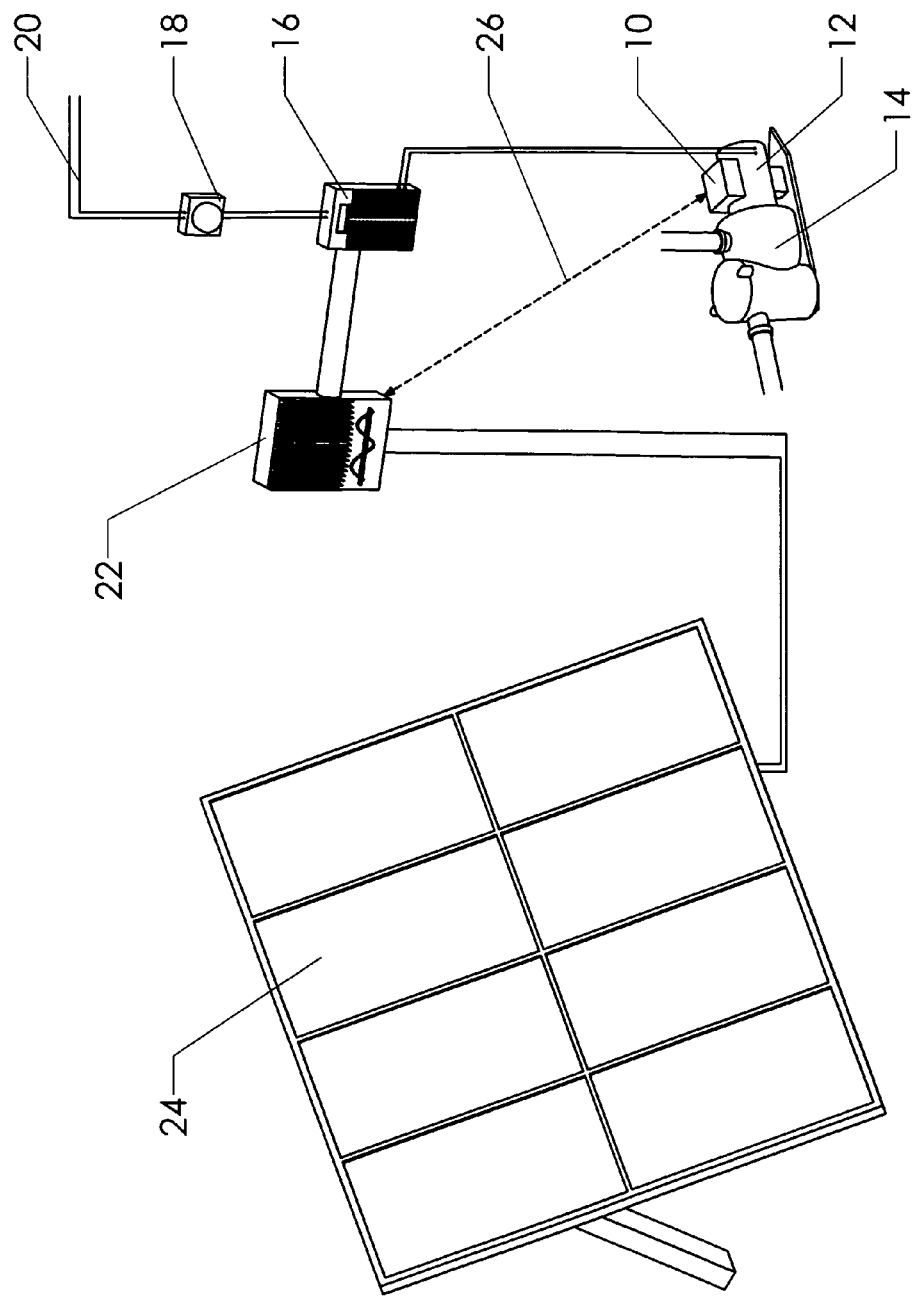
FIG. 2 is a schematic view, showing the components comprising one application of the present invention.

FIG. 2 illustrates a simple example in which a single load (a swimming pool circulation pump) is linked to a single energy harvesting device (a photovoltaic solar array). Solar array 24 includes one or more solar panels producing DC electrical energy. Pump 14 is used to circulate water in a swimming pool. As those skilled in the art will know, residential pool pumps consume a significant amount of energy. These are typically powered by single-phase induction motors in the range of ½ to 1 HP. In some climates they represent the single largest consumer of electricity in the household. It is therefore desirable to use the energy from the solar array to run the pool pump.

A prior art system would store the solar energy in several batteries. As discussed previously, however, the batteries are often the "weak link" in such a system. The present invention omits the batteries. DC energy is fed from the solar array to inverter 22. The inverter is a sophisticated device which monitors the state of the electricity being fed from power grid 20 through load center 16 and into the facility. The inverter monitors the amplitude, cyclic rate, and phase of the power on the grid. It then synthesizes an AC waveform using the input DC energy from the solar array as a source. The AC waveform it creates precisely matches that found on the power grid.

The inverter's output is fed directly into load center 16. It is important for the reader to realize that the inverter's output is not isolated to a single circuit. Rather, it is fed onto the main conductive busses in the load center. In effect, the inverter's output is substituted for a portion of the energy coming from power grid 20 through power meter 18. In fact, in periods where energy usage in the facility is low and the output of solar 24 is relatively high, there may even be a net flow back from load center 16 to the AC power grid.

The technology used in the inverter is known in the art and forms no part of the present invention. However, the availability of an amplitude and phase matched inverter makes the present invention practical. An example of a suitable inverter is the XANTREX inverter made by Xantrex Technology of Seloigenstadt, Germany.

Such inverters have sophisticated control circuitry which can accurately measure the amount of energy the inverter is feeding into the load center. Such an "inverter energy monitor" is often integral with the inverter itself. However, if no such monitor is provided in the inverter, then a separate inverter energy monitor can be added to the inverter output line.

Pump 14 is powered by motor 12. AC electrical power is provided through load center 16. Motor controller 10 starts and stops the motor as needed, and varies the amount of electrical energy being fed to the motor.

The invention can be used with a simple pool pump having only the capability to switch on and off. However, the invention's true potential is best realized using a pump which is capable of variable speed. One suitable pump is the INTELLIFLO pump which is marketed by Pentair Water Pool and Spa, Inc., of Sanford, N.C. This pump can operate over a wide range of speeds. Its power consumption is likewise controllable. Motor controller 10 controls the operation of motor 12. As an example, it can cause the motor to operate at slow speeds in order to maintain a slight circulation that will prevent freezing in cold weather. It can cause the motor to operate at high speeds when significant pool filtration is needed. Motor controller 10 is able to vary the amount of energy supplied to the electrical load (the motor).

In the present invention, the inverter energy monitor associated with inverter 22 monitors the inverter's energy output (which will be somewhat reduced from the energy output of the solar array due to conversion inefficiency). This first controlling device communicates with motor controller 10 over communication link 26. From this information the motor controller "knows" the amount of energy and the rate of energy delivery (power) available from the solar array via the inverter. The motor controller can then set an appropriate motor speed so that the motor consumes no more energy than is being generated by the inverter. In this way, the homeowner can be assured that the amount of energy being consumed by the pool pump equals the amount of energy being harvested by the inverter from the solar array. The energy from the solar array is not necessarily being used by the pool pump, but the two devices are in balance.

Of course, the inventive method is not limited to solar power. It is ideally suited to any energy harvesting device which draws energy from a naturally variable energy source. Examples include solar arrays (variable output corresponding to variable sunlight), wind generators (variable output corresponding to variable wind), tidal generators (variable output according to variable tidal flows), and similar devices. All these energy sources vary in unpredictable ways. While some of the output is predictable (such as the daily solar cycle) some is inherently unpredictable over long periods (as a result of variations such as cloud cover).

The matching of the load to the energy harvesting device can assume many forms. The simplest form is an instantaneous power match where the rate of energy delivery (power) from the energy harvesting device is matched to the rate of energy consumption for the load. More sophisticated matching schemes are preferable in many applications, however, since the power produced by a renewable source (such as a solar array) varies with the time of day and the weather conditions. A more appropriate scheme might therefore match the total energy consumed by the load within a 24 hour period against the total amount of energy harvested by the energy harvesting device in the same 24 hour period. Even longer times could be used—such as a week.

A key component is the communication link between the energy harvesting device and the load controller. Returning now to the simple embodiment of FIG. 2, those skilled in the art will know that communication link 26 can assume many forms, so long as it conveys information regarding the energy being produced by the inverter to the load controller controlling the electrical load. Examples include:

1. A wireless link using an existing protocol such as ZIGBEE or BLUE TOOTH;
2. A wide area network ("WAN") protocol;
3. A hard-wired link such as a twisted pair;
4. A frequency-modulated signal placed on the load center and thereby placed on the entire electrical system within the facility through the conductors attached to the load center; and
5. A communicating pair of ultrasonic transducers.

Radio frequency information transfer devices—such as the ZIGBEE protocol—are particularly easy to implement and therefore represent a preferred embodiment. ZIGBEE is a defined communication protocol suitable for use with small, low-power digital radios. It is based on the IEEE 802.15.4-2003 standard. ZIGBEE hardware modules typically integrate a microcontroller having associated memory with a digital radio. They consume very little power, so that continuous operation of two years or more is possible on a single battery.

The ZIGBEE protocol allows multiple ZIGBEE hardware modules to organize themselves into a network. The communication pattern loosely follows human conversation patterns. All modules within range of a transmission monitor all transmissions, and all transmissions made by any module are not directed to any particular recipient but instead to the network as a whole. A particular ZIGBEE module which is currently in possession of data to transmit will wait for a break in the "conversation" and then transmit its data.

Thus, a ZIGBEE based network does not have to be initialized. Rather, the modules on the network will find each other over time. The system works well for data transmission that is not rapidly changing and which is not time critical (since some time may lapse before the data can be transmitted).

Figure 3:
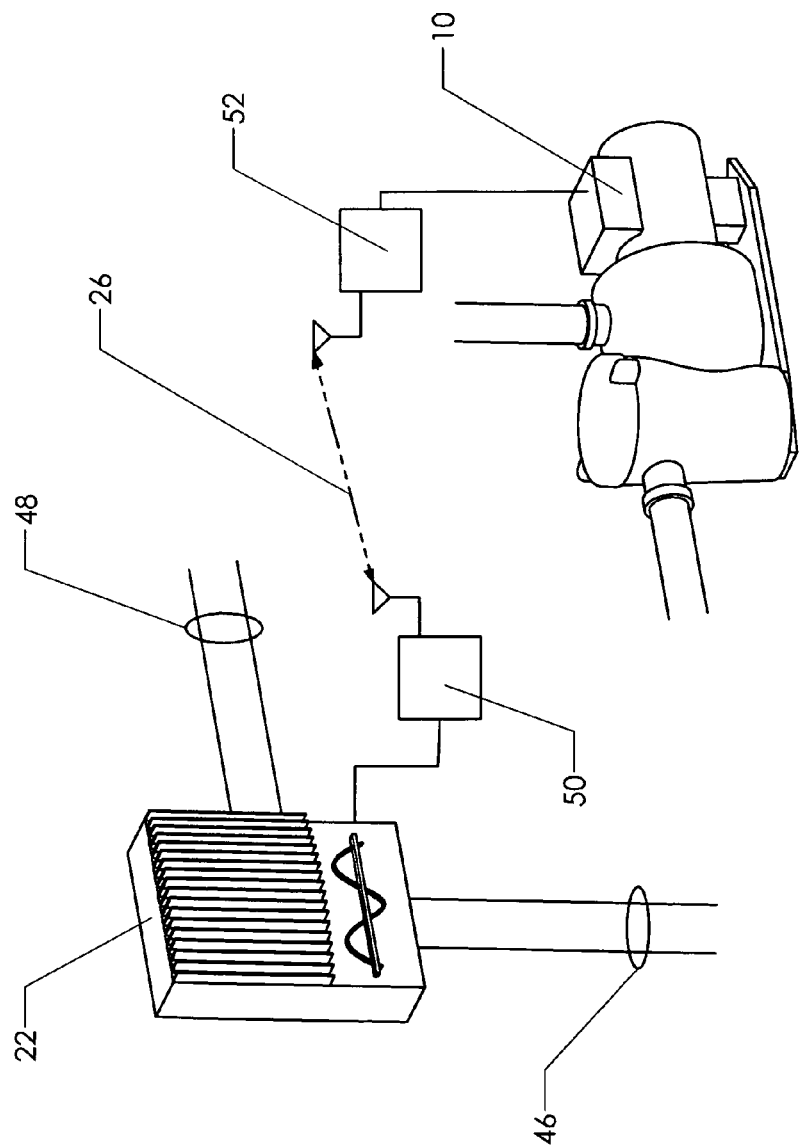
FIG. 3 is a schematic view, showing the use of a radio frequency communication link in the present invention.

ZIGBEE is well suited to the present invention. FIG. 3 shows an embodiment using this wireless data transfer protocol. A first ZIGBEE hardware module can be associated with inverter 22 (R/F interface module 50). It receives energy production information from an inverter energy monitor integral to inverter 22. A second ZIGBEE hardware module (R/F interface module 52) is then associated with motor controller 10. The first ZIGBEE module periodically transmits data concerning the inverter's current power output. The second ZIGBEE module associated with motor controller 10 receives this information and communicates it to the motor controller. The motor controller then preferably commands a speed for motor 12 which consumes the same amount of power that the inverter is at that moment producing. This is in effect an "instantaneous" energy balance, since power is defined as energy per unit time. Thus, if the power of the two devices is matched then the rate of energy consumption is at all times kept equal to the rate of energy production and the user may be assured that the total energy consumed by the load will equal (or very nearly equal) the total energy harvested by the energy harvesting device.

Figure 4:
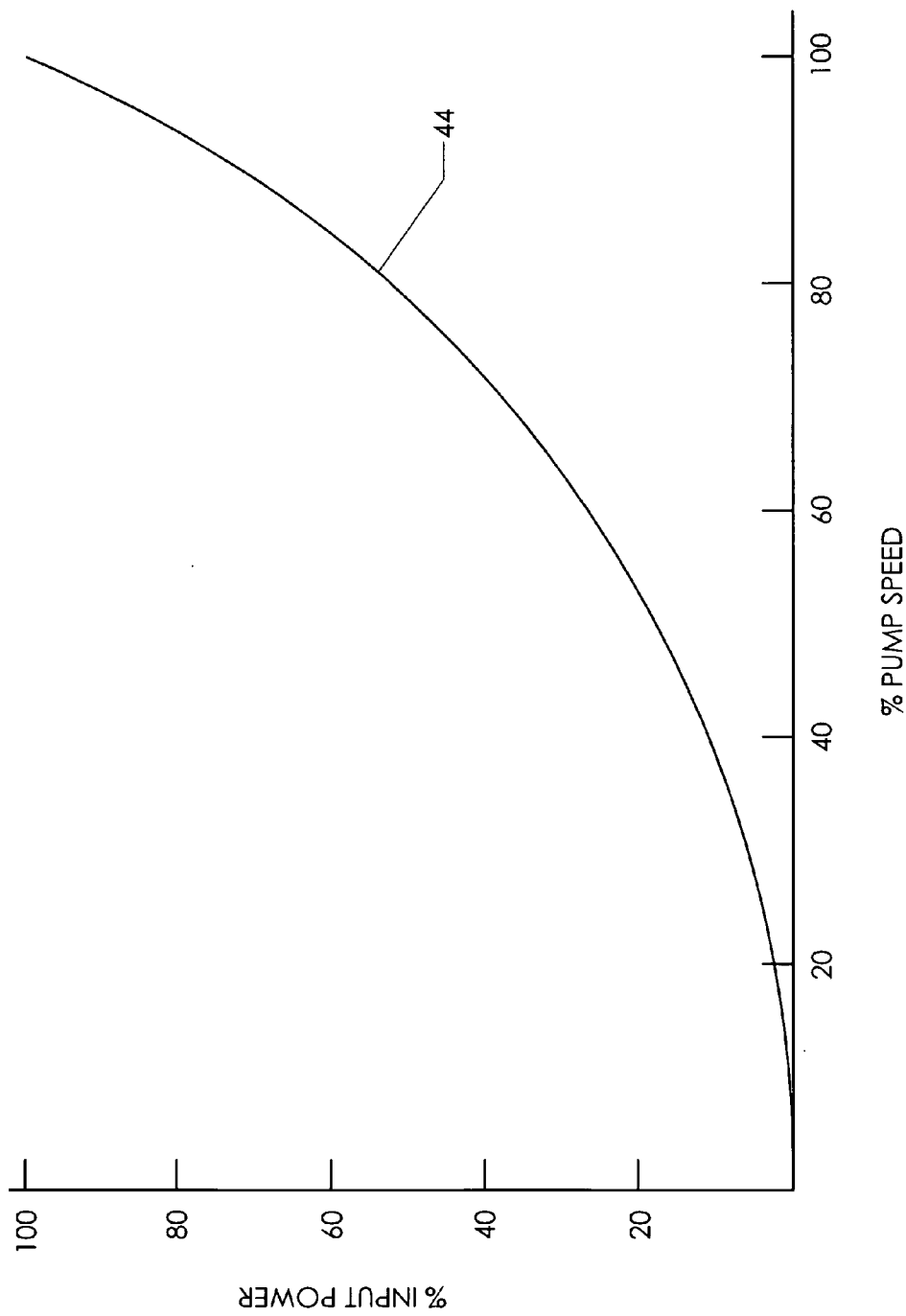
FIG. 4 is a graphical view, depicting the power consumption of a pump motor as a function of motor speed.

FIG. 4 shows a simple plot of pump speed (expressed as a percentage) versus the pump's power consumption (also expressed as a percentage). The reader will observe that the relationship is highly non-linear. It is also apparent that relatively slow pump speeds consume much less energy. Thus, when the load is a variable speed pump such as the INTELLIFLO, the motor load may be widely varied to suit the available solar power.

If ZIGBEE hardware modules are used, they may be battery powered. However, since both are associated with line-powered devices, they are preferably powered by small transformers so that they may remain in operation indefinitely. The microcontroller within a ZIGBEE hardware module is often programmable so customized features may be added. One or both of the two ZIGBEE modules may be used as a control computer. It is also possible to add encryption techniques so that the messages transmitted are secure. The ZIGBEE protocol has security measures which may be used as well.

Those skilled in the art will realize that many other communication devices could be substituted for the ZIGBEE protocol just described. However, as ZIGBEE is presently very cheap and widely available, it represents a preferred embodiment.

Figure 5:
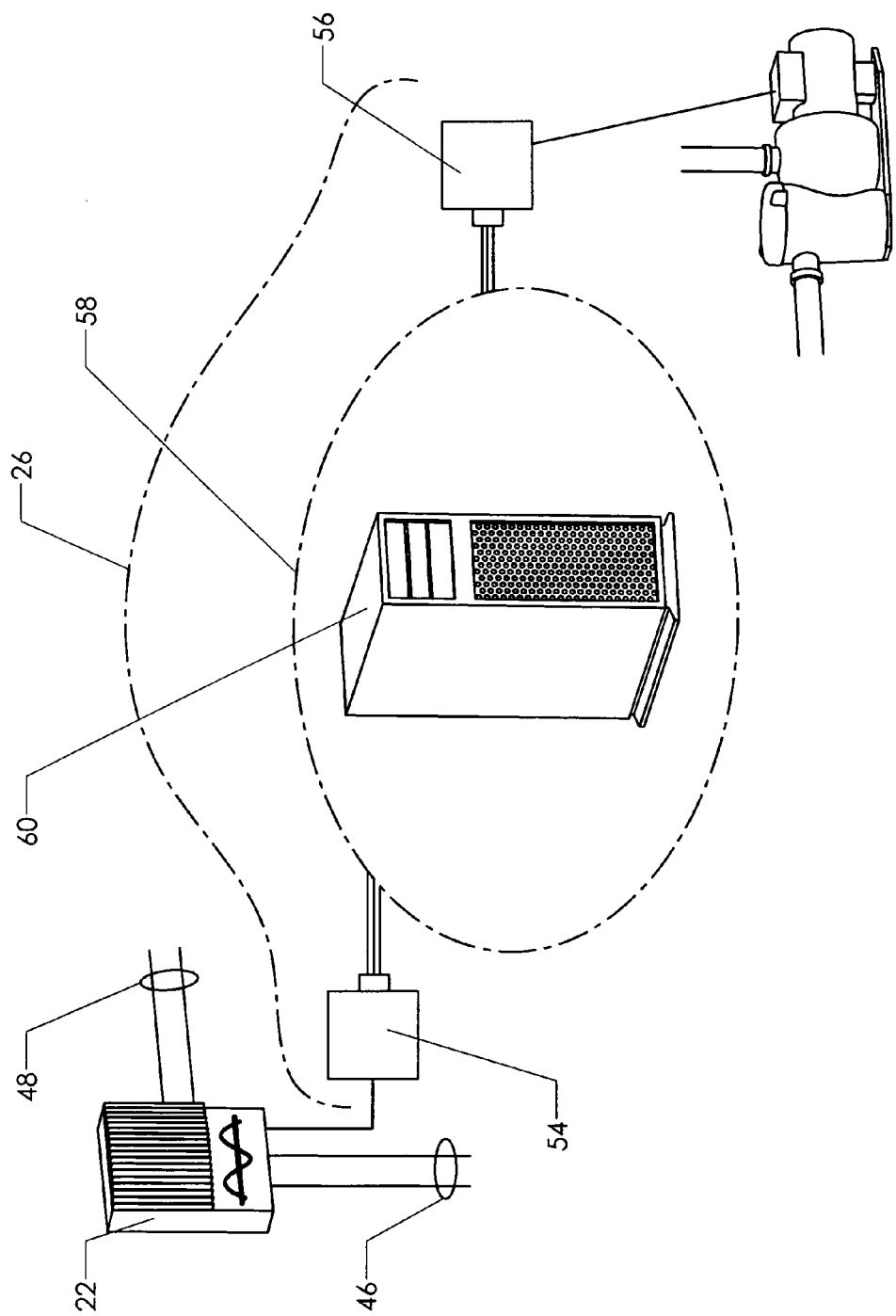
FIG. 5 is a schematic view, showing the use of an Internet communication link in the present invention.

Of course, many other communication technologies may be used in the present invention. FIG. 5 shows an embodiment using the Internet. Inverter 22 is equipped with Internet interface module 54. This is connected to Internet 58 using a hard line, wireless router, or other suitable method. The motor controller is likewise equipped with an Internet interface module 56. The two Internet interface modules may communicate directly with each other over the Internet. On the other hand, both Internet interface modules could communicate with a control computer 60 via the Internet. The use of a control computer allows more rule-based flexibility in the operation of the system (Of course, the control computer could also be located proximate the inverter or proximate the motor controller, or be an integral part of one or both of these devices).

The reader will thereby understand that the present invention allows the matching of the motor's consumption to the power output then available from the inverter. The system is by no means limited to that one objective, however. The user is preferably allowed to customize the device by enabling more options. For instance, a user might give the system two potentially competing directives such as (1) Only use solar power; and (2) "Turn over" the water in the pool at least twice per day. The user would be asked about the pool's volume so that a "turn over" rate could be determined.

The system would then run the pump until the desired turnover is achieved. If at that point solar energy is still available, the system would shut down the pump and the inverter's output would be used to power other loads within the facility. The provision of two such directives may require that one be given precedence. The user might select the turnover rate as being more important. On a cloudy day, the system would then need to supply some or possibly all of the pump's energy from the power grid.

If the system includes a memory device even more complex directives are possible. Some users may wish to include an "energy banking" function. In this arrangement the memory device would keep a record of how much energy the inverter transmitted to the load center over a given time period. For some periods this might represent a surplus over what the pool pump consumed. This energy would be regarded as being in the "bank" for future use. On the next cloudy day the system would "charge against" this banked energy by drawing directly from the power grid to power the pump only until the supply of banked energy is indicated as exhausted.

In this way, the user might define as a goal the net use of exclusively solar power to power the pump over an extended period—such as thirty days. On some days the pump might run exclusively on grid power. On other days surplus solar power might be fed to the AC grid. The net energy usage of the pool pump would still be matched to the output of the solar array. Such a system would also allow the pool pump to be run at night.

Figure 6:
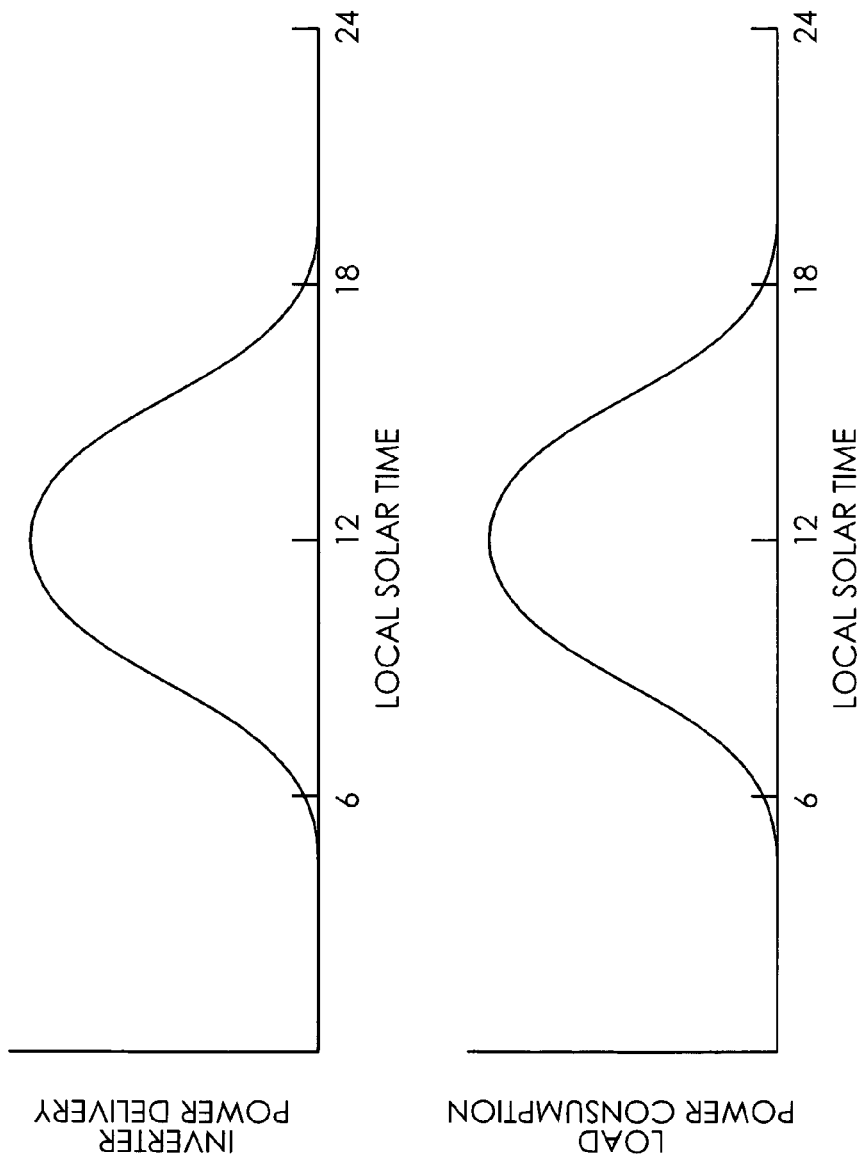
FIG. 6 is a graphical view, showing power generation and consumption as a function of solar time for a single inverter and a single load.
Figure 7:
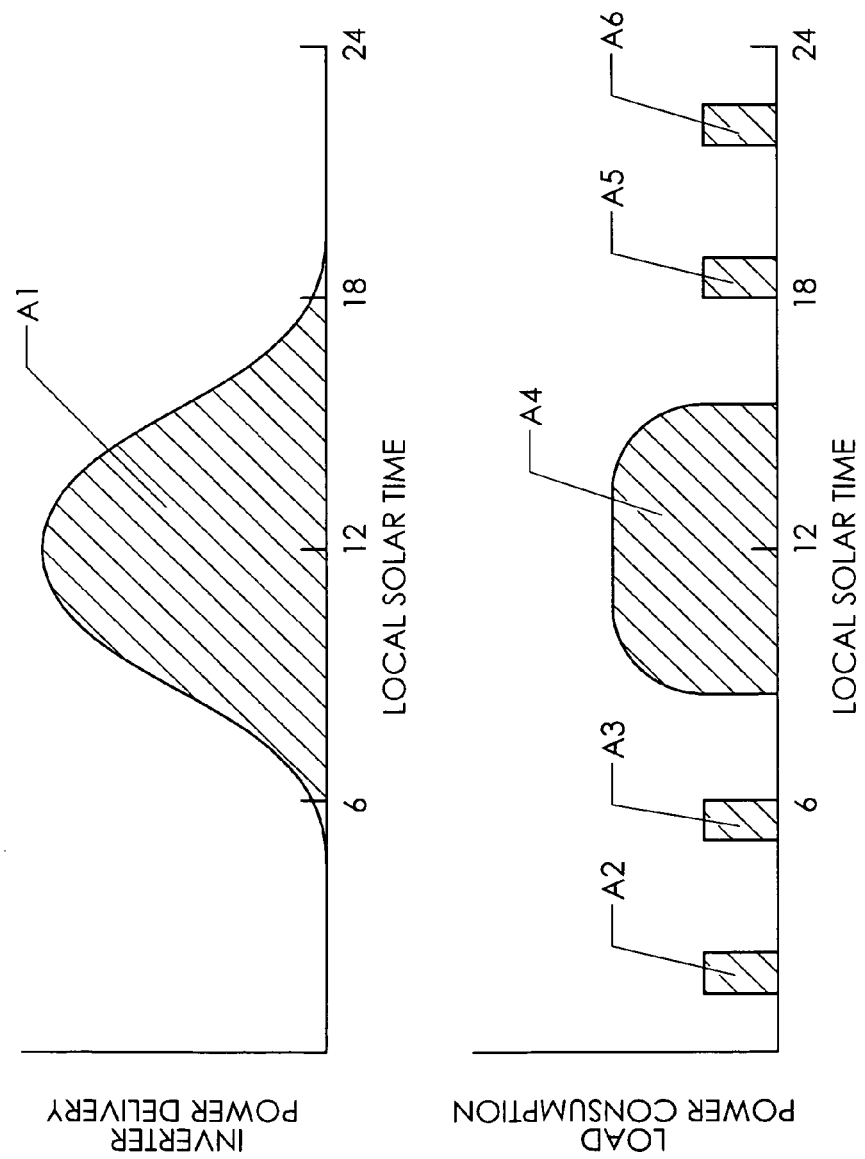
FIG. 7 is a graphical view, showing the "energy banking" concept applied to a single inverter and a single load.

FIGS. 6 and 7 graphically illustrate the operation of these "energy banking" functions. FIG. 6 shows a plot of inverter power production over the course of one day in the upper view. Power is defined as energy per time (such as joules per second). Thus, the upper plot shows the instantaneous power delivery of the inverter over time. This particular inverter is drawing DC power from a solar array. The curve depicts the path of the sun across the sky on a cloudless day.

The lower plot in FIG. 6 represents the power consumption over time by a linked electrical load—such as a pool pump. In this embodiment, the power consumption is adjusted to completely consume the available power being produced by the inverter over time. When no sun is shining on the photovoltaic array feeding the inverter, no power is produced and no power is consumed. The plot in FIG. 6 represents a sunny day with no passing clouds. Under this arrangement, the pool pump cannot be run when it is dark.

The use of computer control with an associated memory allows more sophisticated "energy banking." This is shown in FIG. 7. The upper curve is the same as for FIG. 6—representing the output of the solar array on a sunny day. The lower curve, however, is significantly altered. The reader will recall that the pool pump and its motor controller are directly connected to the AC grid. It can draw power from the AC grid at any time and is not dependent upon the output of the solar array to run. However, in the embodiment of FIG. 7, the user has dictated that the total energy consumed by the pool pump in any given day cannot exceed the amount of energy produced by the inverter attached to the solar array. The user has also instructed the control computer that the pool pump must be run periodically in the dark hours. The motor controller energizes the pool pump as shown in the lower plot of FIG. 7.

The pump is run for a short period at low power in the early morning and just at sunup (5-6 A.M.). The pump is run for a long period at a relatively high power consumption rate from 8 A.M. to 5 P.M.). The pump is then run for two more intervals in the evening.

Those skilled in the art will know that the area $A_1$ under the curve in the upper plot represents the total energy delivered by the inverter in the 24 hour period. The sum of the areas $A_2, A_3, A_4, A_5,$ and $A_6$ in the lower part represents the total energy consumed by the pump in the same 24 hour period. The reader will thus observe that the energy consumed has been balanced against the energy harvested by the solar array and delivered to the grid by the inverter.

This is true even though the energy fed on to the AC grid may not be directly consumed by the pool pump. As an example, when the pool pump is running for the first time of the day (between 1 and 2 A.M.) the power it is using comes from the AC grid (and may in fact be produced by a remote hydroelectric or other facility). Likewise, the energy being fed to the AC grid by the inverter between 6 A.M. and 8 A.M. is not being used by the pump (since the pump is off). Thus, the invention does not seek to feed the load directly from the renewable energy source. Rather, it seeks to balance the energy consumed by the load with the energy being harvested from a designated renewable source.

Figure 8:
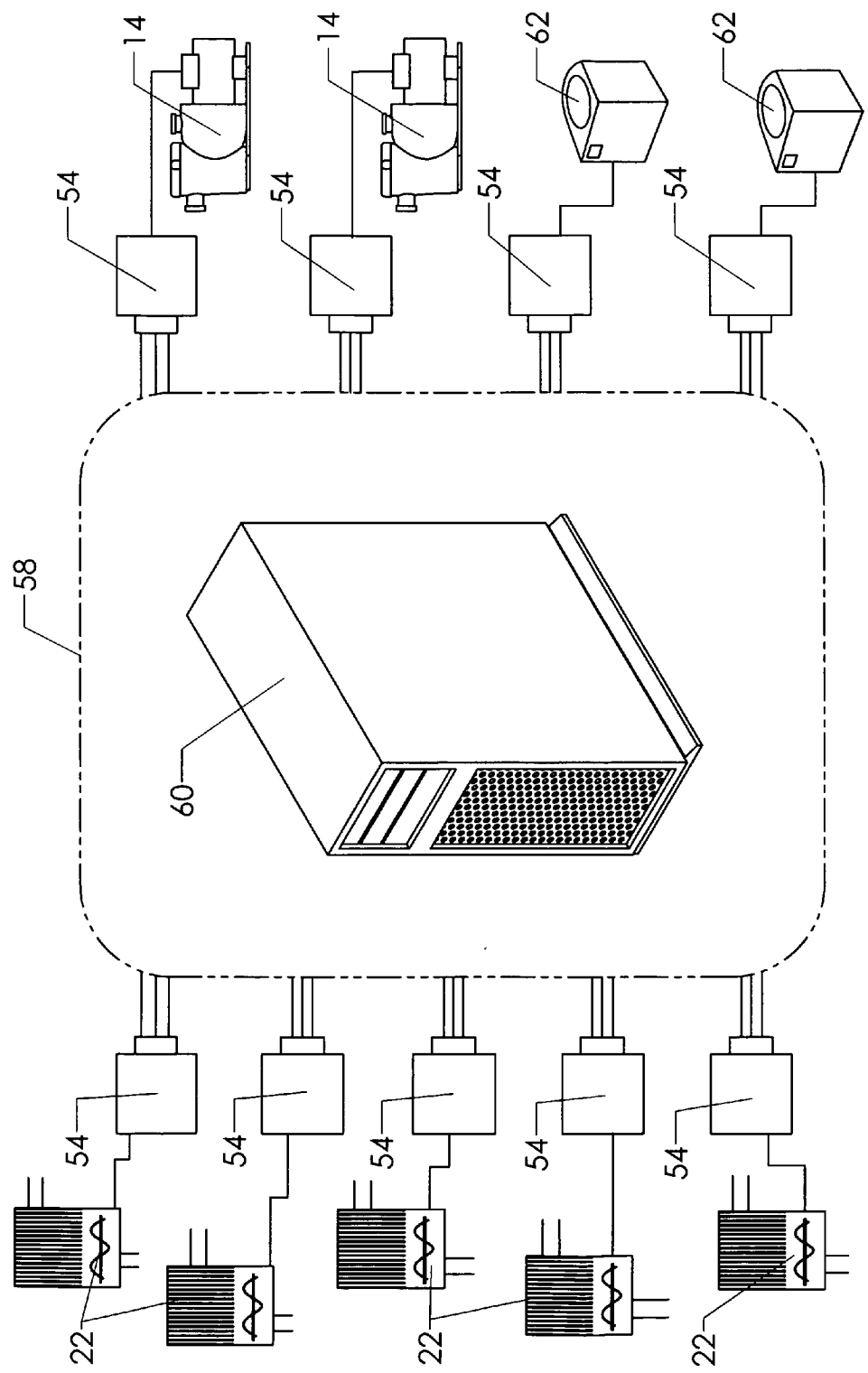
FIG. 8 is a schematic view, showing the use of multiple inverters and multiple loads.

The reader will thereby appreciate that the system is equally applicable to an embodiment featuring multiple inverters and multiple loads. FIG. 8 shows an integrated system including five separate inverters 22 (each of which is fed from a renewable energy harvesting device such as a solar array or a wind turbine). Each of these inverters features an Internet interface module 54 which delivers the inverter energy monitor information to the Internet 58.

A variety of electrical loads are also present. Two pumps 14 and two HVAC units 62 are included in this example. Each of these loads has an associated controller which controls the amount of power delivered to the load. Each of these load controllers is connected to an Internet interface module 54 so that the loads may also be in communication with the Internet 58.

It is preferable in this embodiment to provide a control computer 60 which can govern the desired energy balance. Some or all of the inverters and loads may be located in different locations.

Figure 9:
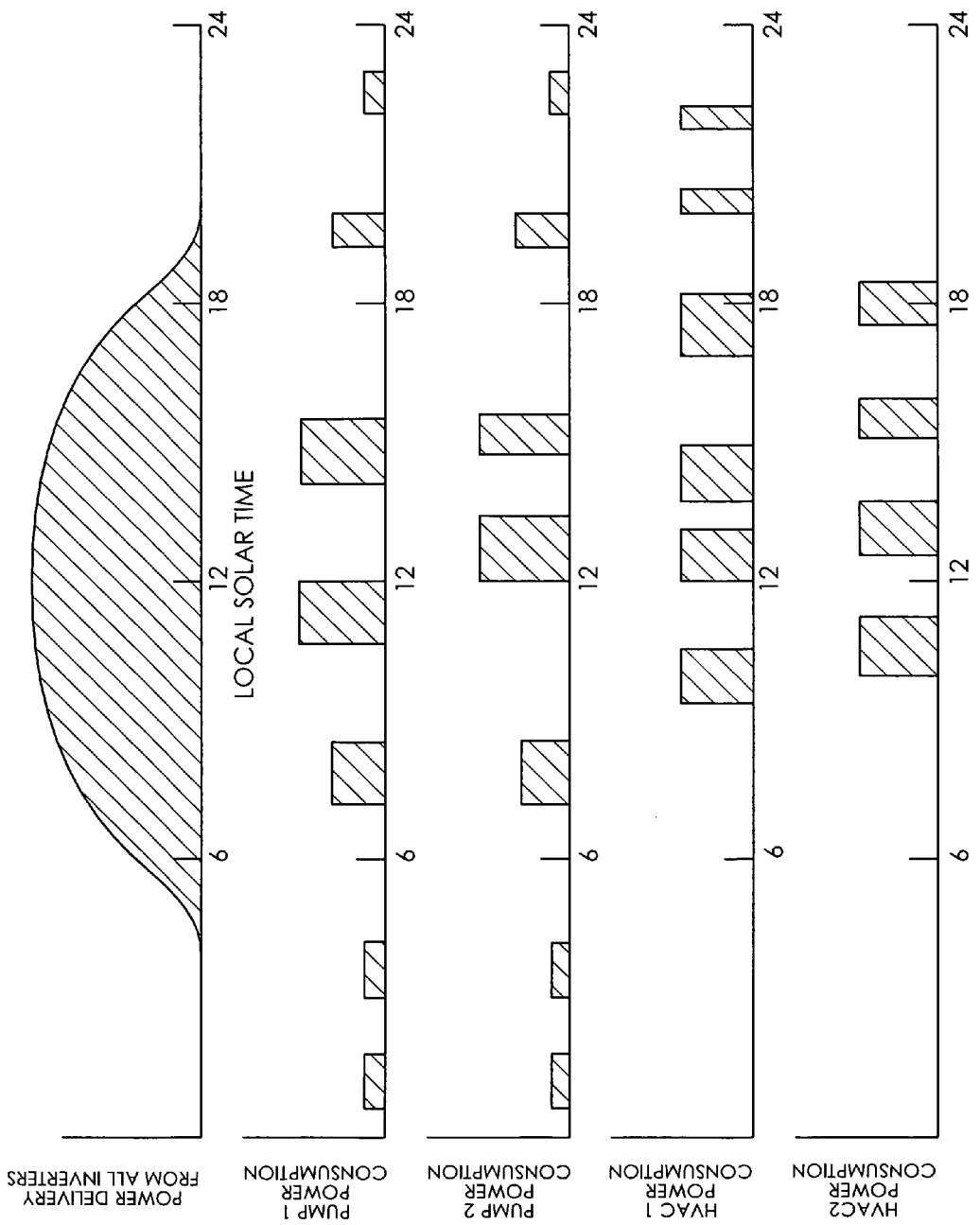
FIG. 9 is a graphical view, showing the "energy banking concept applied to multiple inverters and multiple loads.

FIG. 9 graphically depicts energy production and consumption for an embodiment of the system shown in FIG. 8. The embodiment of FIG. 9 uses five separate solar arrays located near each other and feeding the five separate inverters (all of which feed the power produced onto the AC grid). Thus, the five solar arrays perform similarly to produce the cumulative power output versus time plot shown in the upper view of FIG. 9.

The loads—however—have quite different requirements. The first two loads (Pump 1 and Pump 2 in the plot) are pool circulation pumps. The third load (HVAC 1) is a building HVAC compressor in a first building and the fourth load (HVAC 2) is a building HVAC compressor in a second building having a significantly different solar load.

The energy available from the five solar arrays is represented by the area under the power curve in the upper plot. Control computer 60 has the discretion to allocate this available energy to the four loads according to user-defined rules. Assuming the buildings are located in a temperate region in the spring, the HVAC units do not need to be run in the early morning. The control computer also uses the rule that the temperature within the controlled building cannot exceed 78 degrees Fahrenheit and—if possible within the energy available—should not exceed 74 degrees Fahrenheit during business hours.

The control computer commands the controllers associated with each of the four loads to operate as shown in the four lower plots of FIG. 9. Again, if the total area under the curves in all the lower four plots does not exceed the total area under the curve of the upper plot, then the energy consumed by all the loads has not exceeded the energy delivered by the five inverters.

The rules the system uses to operate can also be adjusted to reflect cost balance. For example, in some areas the energy sold to commercial users is available at a reduced rate at night. The system could use this information to bias the loads toward night operation. This would be particularly effective if the energy source being used is solar, since a solar array tends to produce the most energy during the peak demand portion of the day. A user operating the inventive process could thereby sell energy to the AC grid during the peak demand period and buy energy from the AC grid during the low cost/low demand period.

Another operation rule that could be used by the control computer is the so-called "demand response" operating scheme. Power companies in peak demand areas are susceptible to grid failure during demand spikes (such as very hot days). The control computer could be configured to receive a message from the power company indicating a demand spike (such as a message sent over the Internet). The control computer could then shift its operating schedule so that the inverter delivers needed power to the AC grid during the demand peak and pulls power back from the AC grid during off-peak hours.

A main objective of the system will generally be the creation of an energy balance over a defined period of time. In its simplest form, the defined period of time can be very short (such as an interval between 1/10 of one second and 60 seconds). Those skilled in the art will realize that an energy balance over a very short interval effectively becomes a power balance (since power is defined as energy delivered per unit time). This power balance approach will be suitable for some applications.

The defined period of time will probably be longer for most users. The interval could be one hour or one day. Using one day as the interval is particularly helpful for solar applications so that the fixed daily cycle of sunlight will be captured. However, some users may wish to use a weekly interval to capture weather variations. A month could be used, and even a year could be used in some applications.

Some users may also wish to control energy consumption on the basis of energy production during a historical period. As an example, a user may wish to program the system to deliver an amount of energy to the loads that is equal to the amount of energy harvested from renewable devices during the preceding time interval (such as regulating consumption in one week to be equal to production in the preceding week).

A sophisticated user can refine the proposed inventive system to any desired degree. As an example, those skilled in the art will know that if the pump's power consumption is exactly matched to the inverter's output, some net loss will occur due to resistance losses in the conductors. The resistance losses can be determined and mapped into the software. This would produce a variable offset, where the motor controller "knows" it must consume slightly less energy than that being transmitted by the inverter. Transitory phenomena—such as motor current draw on start-up—could also be considered.

Those skilled in the art will realize that the same approach could be applied to an endless variety of energy producing and consuming devices. The energy producing device might be a wind turbine, while the energy consuming device could be an air conditioning unit. The application would be different, and different governing principles might well be involved. However, the same basic components would work.

Although the preceding description contains significant detail, it should not be construed as limiting the scope of the invention but rather as providing illustrations of the preferred embodiments of the invention. The inventive device could be realized in many different ways. Thus, the examples provided are properly viewed as embodiments of the invention rather than a definition of the invention's scope.

Having described our invention, we claim:

1. A method for regulating energy consumption of at least one electrical load in order to use a desired level of renewable energy, said at least one electrical load being connected to an AC grid, said AC grid having an electrical current with an amplitude and a phase, comprising:
   a. providing at least one renewable energy harvesting device, said at least one device harvesting energy from a naturally variable energy source;
   b. providing at least one inverter;
   c. said at least one inverter receiving electrical power from said at least one renewable energy harvesting device;
   d. said at least one inverter converting said electrical power from said at least one renewable energy harvesting device into AC electrical current having an amplitude and phase which is matched to said amplitude and phase of said AC grid electrical current;
   e. applying said amplitude and phase matched AC electrical current from said at least one inverter to said AC grid;
   f. defining a time interval;
   g. providing an inverter energy monitor which determines the amount of energy said at least one inverter has provided to said AC grid during said time interval;
   h. providing a load controller which controls the amount of electrical energy delivered to said at least one electrical load from said AC grid;
   i. providing a communication link between said at least one inverter energy monitor and said load controller, said communication link communicating the amount of energy said at least one inverter is providing to said AC grid at any given time; and
   j. using said load controller to adjust said amount of energy delivered to said at least one electrical load so that said amount of energy delivered to said at least one electrical load during said time interval is equal to said amount of energy said at least one inverter has provided to said AC grid during said time interval.

2. A method for regulating energy consumption of at least one electrical load as recited in claim 1, wherein said defined time interval is one day, so that the amount of energy consumed by said at least one electrical load during said day is equal to the amount of energy provided to said AC grid by said at least one inverter during said day.

3. A method for regulating energy consumption of at least one electrical load as recited in claim 1, wherein said defined time interval is very short, so that the amount of energy being consumed by said at least one electrical load at any given point in time is substantially equal to the amount of energy provided to said AC grid by said at least one inverter during said very short time interval.

4. A method for regulating energy consumption of at least one electrical load as recited in claim 1, wherein said defined time interval is one week, so that the amount of energy consumed by said at least one electrical load during said week is equal to the amount of energy provided to said AC grid by said at least one inverter during said week.

5. A method for regulating energy consumption of at least one electrical load as recited in claim 1, wherein said communication link between said at least one inverter energy monitor and said load controller comprises:
   a. a radio frequency transmitter connected to said at least one inverter; and
   b. a radio frequency receiver connected to said at least one load controller.

6. A method for regulating energy consumption of at least one electrical load as recited in claim 1, wherein said communication link between said at least one inverter energy monitor and said load controller comprises an Internet link.

7. A method for regulating energy consumption of at least one electrical load as recited in claim 6, wherein said Internet link comprises:
   a. an Internet interface module radio frequency connected to said at least one inverter; and
   b. an Internet interface module connected to said at least one load controller.

8. A method for regulating energy consumption of a plurality of electrical loads in order to use a desired level of renewable energy, said electrical loads being connected to an AC grid, said AC grid having an electrical current with an amplitude and a phase, comprising:
  a. providing a plurality of renewable energy harvesting devices, wherein each of said plurality of energy harvesting devices harvests energy from a naturally variable energy source;
  b. providing a plurality of inverters;
  c. said plurality of inverters receiving electrical power from said plurality of energy harvesting devices;
  d. each of said plurality of inverters converting said electrical power from said renewable energy harvesting devices into AC electrical current having an amplitude and phase which is matched to said amplitude and phase of said AC grid electrical current;
  e. applying said amplitude and phase matched AC electrical current from said inverters to said AC grid;
  f. defining a time interval;
  g. providing an inverter energy monitor which determines the amount of energy each inverter has provided to said AC grid during said time interval;
  h. providing a load controller which controls the amount of electrical energy delivered to each of said electrical loads from said AC grid;
  i. providing a communication link between said inverter energy monitor and said load controller, said communication link communicating the amount of energy said inverters are providing to said AC grid at any given time; and
  j. using said load controller to adjust said amount of energy delivered to said electrical loads so that said amount of energy delivered to said electrical loads during said time interval is equal to said amount of energy said inverters have provided to said AC grid during said time interval.

9. A method for regulating energy consumption of at least one electrical load as recited in claim 8, wherein said defined time interval is one day, so that the amount of energy consumed by said at least one electrical load during said day is equal to the amount of energy provided to said AC grid by said at least one inverter during said day.

10. A method for regulating energy consumption of at least one electrical load as recited in claim 8, wherein said defined time interval is very short, so that the amount of energy being consumed by said at least one electrical load at any given point in time is substantially equal to the amount of energy provided to said AC grid by said at least one inverter during said very short time interval.

11. A method for regulating energy consumption of at least one electrical load as recited in claim 8, wherein said defined time interval is one week, so that the amount of energy consumed by said at least one electrical load during said week is equal to the amount of energy provided to said AC grid by said at least one inverter during said week.

12. A method for regulating energy consumption of at least one electrical load as recited in claim 8, wherein said communication link between said at least one inverter energy monitor and said load controller comprises:
  a. a radio frequency transmitter connected to said at least one inverter; and
  b. a radio frequency receiver connected to said at least one load controller.

13. A method for regulating energy consumption of at least one electrical load as recited in claim 8, wherein said communication link between said at least one inverter energy monitor and said load controller comprises an Internet link.

14. A method for regulating energy consumption of at least one electrical load as recited in claim 13, wherein said Internet link comprises:
  a. an Internet interface module radio frequency connected to said at least one inverter; and
  b. an Internet interface module connected to said at least one load controller.

15. A method for regulating energy consumption of an electrical load in order to use a desired level of renewable energy, said electrical load being connected to an AC grid, said AC grid having an electrical current with an amplitude and a phase, comprising:
  a. providing a renewable energy harvesting device, harvesting energy from a naturally variable energy source;
  b. providing an inverter;
  c. said inverter receiving electrical power from said renewable energy harvesting device;
  d. said inverter converting said electrical power from said renewable energy harvesting device into AC electrical current having an amplitude and phase which is matched to said amplitude and phase of said AC grid electrical current;
  e. applying said amplitude and phase matched AC electrical current from said inverter to said AC grid;
  f. providing an inverter power monitor which determines the amount of power said inverter is providing to said AC grid at any given time;
  g. providing a load controller which controls the amount of electrical power delivered to said electrical load from said AC grid;
  h. providing a communication link between said inverter power monitor and said load controller, said communication link communicating the amount of power said inverter is providing to said AC grid at any given time; and
  i. using said load controller to adjust said amount of power delivered to said electrical load so that said power delivered to said electrical load is equal to said amount of power said inverter is providing to said AC grid at any given time.

16. A method for regulating energy consumption of at least one electrical load as recited in claim 15, wherein said defined time interval is one day, so that the amount of energy consumed by said at least one electrical load during said day is equal to the amount of energy provided to said AC grid by said at least one inverter during said day.

17. A method for regulating energy consumption of at least one electrical load as recited in claim 15, wherein said defined time interval is very short, so that the amount of energy being consumed by said at least one electrical load at any given point in time is substantially equal to the amount of energy provided to said AC grid by said at least one inverter during said very short time interval.

18. A method for regulating energy consumption of at least one electrical load as recited in claim 15, wherein said defined time interval is one week, so that the amount of energy consumed by said at least one electrical load during said week is equal to the amount of energy provided to said AC grid by said at least one inverter during said week.

19. A method for regulating energy consumption of at least one electrical load as recited in claim 15, wherein said communication link between said at least one inverter energy monitor and said load controller comprises:
  a. a radio frequency transmitter connected to said at least one inverter; and
  b. a radio frequency receiver connected to said at least one load controller.

20. A method for regulating energy consumption of at least one electrical load as recited in claim 15, wherein said communication link between said at least one inverter energy monitor and said load controller comprises an Internet link.

21. A method for regulating energy consumption of at least one electrical load in order to use a desired level of renewable energy, said at least one electrical load being connected to an AC grid, said AC grid having an electrical current with an amplitude and a phase, comprising:
- a. providing at least one renewable energy harvesting device, said at least one device selected from the group consisting of a solar collector and a wind generator;
- b. providing at least one inverter;
- c. said at least one inverter receiving electrical power from said at least one renewable energy harvesting device;
- d. said at least one inverter converting said electrical power from said at least one renewable energy harvesting device into AC electrical current having an amplitude and phase which is matched to said amplitude and phase of said AC grid electrical current;
- e. applying said amplitude and phase matched AC electrical current from said at least one inverter to said AC grid;
- f. defining a first time interval;
- g. providing an inverter energy monitor which determines the amount of energy said at least one inverter has provided to said AC grid during said first time interval;
- h. defining a second time interval, said second time interval being equal in length to said first time interval;
- i. providing a load controller which controls the amount of electrical energy delivered to said at least one electrical load from said AC grid;
- j. providing a communication link between said at least one inverter energy monitor and said load controller, said communication link communicating the amount of energy said at least one inverter is providing to said AC grid at any given time; and
- j. using said load controller to adjust said amount of energy delivered to said at least one electrical load so that said amount of energy delivered to said at least one electrical load during said second time interval is equal to said amount of energy said at least one inverter has provided to said AC grid during said first time interval.

22. A method for regulating energy consumption of at least one electrical load as recited in claim 21, wherein said first defined time interval is one day long.

23. A method for regulating energy consumption of at least one electrical load as recited in claim 21, wherein said first defined time interval is one week long.

* * * * *